United States Patent [19]

Oteki

[11] Patent Number: 5,630,023

[45] Date of Patent: May 13, 1997

[54] SIGNAL PROCESSOR

[75] Inventor: Sugitaka Oteki, Ikeda, Japan

[73] Assignee: Ricoh Company, Limited, Tokyo, Japan

[21] Appl. No.: 322,498

[22] Filed: Oct. 14, 1994

[30] Foreign Application Priority Data

Oct. 14, 1993 [JP] Japan .................. 5-257348

[51] Int. Cl.⁶ ........................................... G06F 15/18
[52] U.S. Cl. ......................... 395/27; 395/24; 395/21
[58] Field of Search ........................ 395/20–25, 27, 395/26; 382/155–159; 364/807

[56] References Cited

U.S. PATENT DOCUMENTS 4,737,929 4/1988 Denker ........................ 364/807
5,167,006 11/1992 Furuta et al. .................. 395/11

FOREIGN PATENT DOCUMENTS 62-295188 12/1987 Japan ................... G06G 7/60
5-118087 5/1993 Japan .................. G06F 15/18
5-307624 11/1993 Japan ................... G06G 7/60
6-73135 4/1994 Japan .................. G06F 15/18

OTHER PUBLICATIONS

Pearlmutter, "Learning state space trajectories in recurrent neural networks"; IJCNN, pp. 365–372 vol. 2, 18–22 Jun. 1989.

Primary Examiner—Tariq R. Hafiz
Attorney, Agent, or Firm—Lowe, Price, LeBlanc & Becker

[57] ABSTRACT

A signal processor comprises a first shift register delaying an output from a neuron-simulated element by m cycles, a second shift register delaying an output from a neuron-simulated element by n cycles, wherein n is different from m, a logical product circuit for computing two logical products of the outputs from the shift registers, and a circuit for computing an error signal according to a teacher signal and the two logical products.

4 Claims, 14 Drawing Sheets

| 0 | 1 | 2 | 3 | 4 | 5 | 6 | 7 |
|---|---|---|---|---|---|---|---|
| 8 | 9 | 10 | 11 | 12 | 13 | 14 | 15 |
| 16 | 17 | 18 | 19 | 20 | 21 | 22 | 23 |
| 24 | 25 | 26 | 27 | 28 | 29 | 30 | 31 |
| 32 | 33 | 34 | 35 | 36 | 37 | 38 | 39 |
| 40 | 41 | 42 | 43 | 44 | 45 | 46 | 47 |
| 48 | 49 | 50 | 51 | 52 | 53 | 54 | 55 |
| 56 | 57 | 58 | 59 | 60 | 61 | 62 | 63 |

FIG. 5

| Pattern number | [0] | [1] | [2] | [3] | [4] | [5] | [6] | [7] | [8] | [9] | [10] | [11] | [12] | [13] | [14] | [15] | [16] | [17] | [18] | [19] | [20] | [21] | [22] | [23] | [24] |
|---|---|---|---|---|---|---|---|---|---|---|---|---|---|---|---|---|---|---|---|---|---|---|---|---|---|
| [0]  | 0  | 19 | 21 | 28 | 6  | 21 | 26 | 21 | 24 | 3  | 19 | 18 | 24 | 4  | 20 | 18 | 14 | 28 | 10 | 22 | 19 | 19 | 26 |
| [1]  | 19 | 0  | 12 | 29 | 17 | 12 | 17 | 28 | 23 | 20 | 10 | 15 | 29 | 19 | 11 | 15 | 27 | 25 | 19 | 7  | 8  | 28 | 23 |
| [2]  | 21 | 12 | 0  | 19 | 19 | 12 | 13 | 26 | 17 | 22 | 15 | 9  | 13 | 21 | 19 | 17 | 29 | 17 | 19 | 15 | 8  | 28 | 15 |
| [3]  | 19 | 26 | 26 | 0  | 19 | 12 | 29 | 10 | 29 | 14 | 8  | 28 | 6  | 19 | 23 | 29 | 9  | 29 | 13 | 27 | 24 | 6  | 29 |
| [4]  | 28 | 0  | 19 | 27 | 0  | 28 | 25 | 29 | 10 | 24 | 19 | 25 | 27 | 28 | 21 | 17 | 30 | 4  | 26 | 30 | 27 | 27 | 6  |
| [5]  | 6  | 17 | 19 | 17 | 28 | 0  | 21 | 23 | 27 | 3  | 19 | 28 | 6  | 24 | 10 | 26 | 4  | 28 | 4  | 22 | 17 | 15 | 26 |
| [6]  | 21 | 12 | 12 | 28 | 25 | 21 | 0  | 17 | 28 | 22 | 4  | 15 | 24 | 21 | 21 | 14 | 10 | 28 | 23 | 9  | 16 | 28 | 23 |
| [7]  | 26 | 17 | 13 | 29 | 24 | 22 | 17 | 0  | 23 | 25 | 19 | 24 | 31 | 22 | 9  | 31 | 28 | 23 | 20 | 16 | 11 | 31 | 20 |
| [8]  | 21 | 28 | 29 | 10 | 22 | 23 | 0  | 29 | 0  | 17 | 14 | 31 | 22 | 26 | 20 | 17 | 23 | 20 | 24 | 16 | 27 | 24 | 31 |
| [9]  | 24 | 17 | 23 | 24 | 23 | 20 | 17 | 29 | 17 | 0  | 26 | 10 | 23 | 10 | 9  | 23 | 17 | 31 | 19 | 27 | 24 | 10 | 6  |
| [10] | 3  | 20 | 10 | 27 | 3  | 24 | 14 | 24 | 29 | 26 | 0  | 19 | 27 | 19 | 20 | 25 | 19 | 8  | 11 | 23 | 19 | 27 | 25 |
| [11] | 19 | 22 | 14 | 29 | 19 | 25 | 17 | 23 | 0  | 23 | 20 | 0  | 16 | 26 | 25 | 23 | 25 | 24 | 27 | 9  | 20 | 16 | 25 |
| [12] | 18 | 10 | 9  | 28 | 18 | 20 | 14 | 25 | 29 | 22 | 19 | 19 | 0  | 25 | 0  | 20 | 30 | 0  | 25 | 18 | 12 | 26 | 22 |
| [13] | 19 | 15 | 15 | 27 | 15 | 19 | 17 | 23 | 24 | 25 | 0  | 19 | 25 | 0  | 19 | 18 | 24 | 18 | 19 | 7  | 26 | 25 | 29 |
| [14] | 18 | 28 | 28 | 15 | 28 | 18 | 14 | 30 | 19 | 20 | 19 | 16 | 22 | 19 | 0  | 26 | 17 | 11 | 6  | 18 | 24 | 0  | 4  |
| [15] | 19 | 23 | 13 | 29 | 27 | 15 | 31 | 21 | 27 | 19 | 26 | 23 | 23 | 18 | 24 | 0  | 11 | 27 | 24 | 27 | 21 | 29 | 26 |
| [16] | 24 | 17 | 17 | 9  | 15 | 31 | 22 | 26 | 28 | 16 | 23 | 22 | 29 | 21 | 0  | 11 | 0  | 30 | 7  | 23 | 26 | 21 | 30 |
| [17] | 4  | 29 | 9  | 23 | 24 | 8  | 20 | 14 | 30 | 26 | 7  | 29 | 0  | 16 | 18 | 27 | 30 | 0  | 29 | 9  | 24 | 21 | 22 |
| [18] | 20 | 11 | 21 | 6  | 28 | 10 | 21 | 9  | 23 | 22 | 19 | 18 | 21 | 24 | 0  | 24 | 16 | 26 | 11 | 7  | 24 | 22 | 19 |
| [19] | 18 | 15 | 19 | 27 | 4  | 20 | 14 | 22 | 27 | 17 | 27 | 16 | 23 | 28 | 20 | 0  | 28 | 14 | 28 | 22 | 18 | 30 | 30 |
| [20] | 14 | 27 | 29 | 4  | 28 | 21 | 9  | 26 | 28 | 11 | 25 | 24 | 28 | 20 | 18 | 22 | 30 | 24 | 14 | 18 | 26 | 23 | 2  |
| [21] | 28 | 25 | 17 | 28 | 4  | 9  | 16 | 11 | 8  | 27 | 24 | 18 | 6  | 14 | 14 | 0  | 0  | 14 | 22 | 30 | 24 | 17 | 26 |
| [22] | 10 | 19 | 19 | 26 | 21 | 16 | 11 | 24 | 24 | 26 | 23 | 27 | 18 | 22 | 28 | 6  | 18 | 22 | 0  | 28 | 26 | 11 | 24 |
| [23] | 22 | 7  | 19 | 30 | 19 | 27 | 28 | 10 | 19 | 21 | 17 | 26 | 21 | 29 | 0  | 30 | 11 | 30 | 17 | 0  | 13 | 27 | 21 |
| [24] | 19 | 8  | 13 | 22 | 15 | 15 | 31 | 27 | 27 | 23 | 20 | 23 | 24 | 21 | 29 | 27 | 7  | 22 | 11 | 26 | 29 |
| [25] | 26 | 23 | 29 | 6  | 26 | 29 | 23 | 20 | 6  | 25 | 25 | 22 | 29 | 4  | 26 | 30 | 22 | 30 | 2  | 26 | 24 | 21 | 29 | 0 |

| Number of neurons in intermediate layer<br>System | 4 | 8 | 12 | 16 | 20 | 24 | 28 | 32 |
|---|---|---|---|---|---|---|---|---|
| Conventional system | 0 | 0 | 1 | 12 | 21 | 39 | 38 | 76 |
| Present invention | 0 | 4 | 21 | 41 | 59 | 84 | 84 | 93 |

(Unit)

SIGNAL PROCESSOR

FIELD OF THE INVENTION

The present invention relates to a signal processor used in such apparatuses as a neural computer simulating a neural network used in such applications as recognition of characters or graphics, operation control for robots or the like, and associative storage.

BACKGROUND OF THE INVENTION

A system in which neuron-simulating elements each simulating functions of a neuron, a basic unit for information processing in a living body are built into a network for parallel processing of information is so-called the neuron circuit network (neural network). Such operations as recognition of characteristics, associative storage and movement control are executed in a living body quite easily, but most of the operations can not easily be executed by conventional types of Neumann computer.

For this reason, active efforts are now being made to solve these problems by simulating functions of a neural system in a living body, especially functions specific to a living body, namely parallel processing, self learning or the like through computer simulations or production of prototype hardware dedicated to such purposes.

FIG. 9 shows a model of a neuron (a unit in nerve cell) comprising a section for receiving input from other neurons, a section for converting the input according to certain rules, and a section for outputting the result of conversion. A variable weigh "wji" is assigned to each of the portions coupled to other neurons, and the weigh expresses a degree of coupling. When this value is changed, also construction of the network is changed. Learning in the network means change of the values.

FIG. 10 shows a case where the neurons are built into a network to form a hierarchical neural network. In this figure, A1, A2 and A3 indicate a neuron respectively. Each of the neurons A1, A2, A3 is coupled to a number of neurons like the neuron shown in FIG. 9, and processes signals from the other neurons and outputs result of the processing. A hierarchical network consists of an input layer, an intermediate layer, and an output layer, and there is no coupling in each layer, nor that from the output layer to the input layer. One neuron is coupled to a number of other neurons.

FIG. 10 shows a three-layered network consisting of an input layer, an intermediate layer, and an output layer, but it should be noted that it is also applicable to a multi-layered network having a number of intermediate layers.

Description is made hereinafter for operations of the neurons A1, A2, and A3 shown in FIG. 10 with reference to the neuron shown in FIG. 9 as an example. At first, description is made for a forward process.

In the neural network shown in FIG. 10, a signal inputted into the input layer A1 propagates to the intermediate layer A2, where a forward processing is executed. A result of processing in the intermediate layer A2 propagates to the output layer A3, where a forward processing is executed, and finally an output from the neural network is obtained.

Herein a value indicating a degree of coupling between neurons is called coupling coefficient, and a coupling coefficient for a degree of coupling between a neuron No.j and a neuron No.i is expressed by Wji. Types of coupling are divided to an excitation type of coupling in which output becomes larger as a signal received from a communicating neuron is larger, and a suppression type of coupling in which output becomes smaller as a signal received from a communicating neuron be larger, and Wji larger than zero (0) indicates the excitation type of coupling, while that smaller than zero (0) indicates the suppression type of coupling.

Now assuming that a neuron is a neuron No.j and output from the neuron No.i is Oi, Wji·Oi which is a product of the coupling coefficient Wji by the output Oi is an input to the neuron No.i. As each neuron is coupled to a number of neurons, so that $\Sigma Wji \cdot Oi$, which is a sum of inputs to the neurons, becomes an input to the neuron. This is called internal electric potential, and is expressed by the following expression.

$$net_j = \Sigma Wji \cdot Oi \quad (1)$$

Then a non-leaner processing is applied to this input, and the result is outputted. The function then is called neuron response function, and for instance, the sigmoid function as shown by the following expression (2) is used.

$$f(net_j) = 1/\{1 + \exp(-net_j)\} \quad (2)$$

This function is shown in FIG. 11. The value range is "from 0 to 1", and as the input value becomes larger, the value comes closer to "1", while as the value becomes smaller, the value becomes closer to "0". Thus, an output Oj from the neuron j is expressed by the following expression (3).

$$Oj = f(net_j) \quad (3)$$
$$= f(\Sigma Wji \cdot Oi)$$

Next description is made for a learning function for the neural network above. Brie description is made for a general back propagation algorithm (simply called BP algorithm hereinafter) as a leaning process used in numerical calculation.

In the learning process, when a certain input pattern p is given, a coupling coefficient is changed so that an error between an actual output value and a desired output value will be minimized. An algorithm to obtain the change rate is the BP algorithm.

The error between an actual output value (Opk) of unit k and a desired output value (tpk) thereof is defined as expressed by the following expression (4).

$$Ep = (tpk - Opk)^2/2 \quad (4)$$

This indicates an error of the unit k in an output layer, while tpk is teacher data given by a man. In learning, strength of all coupling is changed so that the error will be minimized. Actually, the change rate of Wkj when the pattern p is given is expressed by the following expression (5).

$$\Delta pWkj \propto -\partial E/\partial Wkj \quad (5)$$

Using this change rate, the coupling coefficient Wkj is changed. From the expression (4) above, the following expression (6) is obtained.

$$\Delta pWkj = \eta \cdot \delta pk \cdot Opj \quad (6)$$

Herein, Opj is an input value from the unit j to the unit k. The error signal δpk varies according to whether the unit k is in an output layer or in an intermediate layer. At first, an error signal δpk in the output layer is as expressed by the following expression (7).

$$\delta pk = (tpk - Opk) \cdot f'(net_k) \quad (7)$$

On the other hand, an error signal δpj in an intermediate layer is as expressed by the expression (8) below.

$$\delta p_j = f'(net_j) \cdot \Sigma \delta p_k W_{kj} \tag{8}$$

It should be noted that $f'(net_j)$ is one-time differentiation of $f(net_j)$, and the detail is described later. Thus, $\Delta W_{ji}$ is generally expressed by the following expression (9).

$$\Delta W_{ji}(t+1) = \eta \cdot \delta p_j \cdot O_{pi} + \alpha \cdot \Delta W_{ji}(t) \tag{9}$$

So the expression (10) is obtained. Herein t indicates a priority order in learning, η indicates a learning coefficient, and α indicates a stabilizing coefficient. The first term in the right side of the above expression (9) indicates the $\Delta W_{ji}$ obtained through the expression (6) above, while the second term is added to reduce fluctuation in the error and promote convergence.

$$W_{ji}(t+1) = W_{ji}(t) + \Delta W_{ji}(t+1) \tag{10}$$

Computing for the change rate $\Delta W_{ji}$ of a coupling coefficient is thus started from a unit in an output layer and then shifted to that in an intermediate layer. Learning advances in a direction reverse to that for input data processing, namely in a backward direction. For this reason, in learning by way of back propagation at first data for leaning is inputted, and the result is outputted (forward process). Strength of all coupling is changed so that an error in the result will be minimized (backward process). Again data for leaning is inputted. This process cycle is repeated until convergence.

The conventional type of hierarchical neural network is a form as shown in FIG. 10. Data flow in forward process in this network is as shown in FIG. 12. This figure shows a case of three-layered hierarchical type of network, and in the forward process input signals Oi1 to Oi4 are given into the input layer (a layer in the left side in FIG. 12), and output signals Ok1 to Ok4 are obtained from the output layer (a layer in the right side in FIG. 12).

On the other hand, FIG. 13 shows a data flow in a leaning process. In the learning process, teacher signals tk1 to tk4 are given to the output layer (a layer in the right side in FIG. 13) to update strength of coupling between each neuron so that outputs from the neural network will be matched to the teacher signals. It should be noted that at present most of operations for the leaning process are executed by an external general-purpose computer.

An example of the network realized with an electric circuit is shown in FIG. 14 (Refer to Japanese Patent Laid-Open Publication No.295188/1987). In this circuit are provided a plurality of amplifiers 4 each having a substantially S-shaped transmittance and a resistance feedback circuit network 2 for connecting output from each amplifier 4 to an input terminal of an amplifier in other layer as indicated by an alternate long and short dash line in the figure. To an input side of each amplifier 4 is connected a CR time constant circuit 3 comprising a grounded capacitor C and a grounded resistor R separately. And input currents $I_1$, $I_2$ to IN are inputted to the amplifiers 4 respectively, and an output is obtained as a sum of voltages outputted from the amplifiers 4.

Herein strength of each input or output signal is expressed with a voltage, strength of coupling between neurons with a resistance value of a resistor I connecting I/O lines between the neurons (a lattice point in the resistance feedback circuit network 2), and neuron response function with a transmittance for each amplifier 4. Also as described above, types of coupling are divided to an exciting one and a suppressing one, and mathematically the type is indicated by a positive or a negative sign for a coupling function. However, as it is difficult to indicate positive or negative with any constant in circuit, herein output from the amplifier 4 is divided to two portions (4a, 4b), and one of the two portions is inverted to generate two types of signals, a positive signal and a negative one, and differentiation between positive and negative is realized by selecting the two types of signal. Also an amplifier is used as the sigmoid function f (net) shown in FIG. 11.

Generally when a neural network is constructed with analog circuits, an area of a signal neuron circuit element can be reduced, so that there are provided such advantages as a high integration degree in the neural network or a high execution speed. On the other hand, however, as signal values are expressed with analog values such as a voltage or a current and also computing of each value is executed by an analog element such as an amplifier, there exist dispersion due to the temperature characteristics, and also due to dispersion in a process or manufacturing elements, response characteristics of each element can not be unified, so that output values will disadvantageously become unstable.

In addition, it is difficult to change a value of a coupling coefficient in a neural network through leaning, so that sometimes leaning is executed with an external computer and each coupling coefficient after leaning is downloaded to the hardware to overcome the problem. When this type of method of learning is employed, an additional computer is required, and a learning speed is remarkably retarded.

An example in which a neural network is constructed with digital circuits is shown below. FIG. 15 to FIG. 16 show an example of neural network realized with digital circuits respectively, while FIG. 15 shows an example of a circuit consisting of a signal neuron. In these figures, designated at the reference numeral 11 is a synapse circuit, at 12 a dendrite circuit, and at 13 a cell body circuit.

FIG. 16 shows an example of configuration of the synapse circuit shown in FIG. 15, said synapse circuit provided with a rate multiplier 11b into which a value obtained by multiplying an input pulse f by magnification a (a magnification to be multiplied by a feedback signal; 1 or 2) is inputted, and to the rate multiplier 11b is connected a synapse load register 11c in which a weighed value W is stored. FIG. 17 shows an example of configuration of the cell body circuit 13 consisting of a control circuit 14, a up/down counter 15, a rate multiplier 16, and a gate 17 each connected thereto in this order respectively, and furthermore an up/down memory 18 is provided therein.

In this example, input or output from a neuron unit is expressed with a pulse series, and a quantity of signals is expressed by the pulse density. A coupling coefficient is expressed with a binary number and is stored in the synapse load register 11c.

Computing for signal processing is executed as described below. At first an input signal is inputted into the rate multiplier 11b and a coupling coefficient to a rate value, thus a pulse density for input signals being educed according to the rate value. This operation corresponds to the portion of $W_{ji} \cdot O_i$ in the expression above for a back propagation model. Also the portion of Σ in $\Sigma W_{ji} \cdot O_i$ is realized with an OR circuit shown by the dendrite circuit 12. As types of coupling are divided to an exciting one and a suppressing one, they are previously divided to groups, and a logical sum (OR) is computed for each group. In FIG. 15, F1 indicates an exciting output, while F2 indicates a suppressing output. These two types of output are inputted to the up side and down side of the counter 15 shown in FIG. 17 and counted, thus an output being obtained. This output is a binary number, so that the output is converted to a pulse density using the rate multiplier 16. A neural network can be realized by building a network with a plurality of this neuron units. The learning function is realized by inputting a final output from a network into an external computer, executing numerical computation in the computer, and writing the result in the synapse load register 11c to store a coupling coefficient therein.

As described above, when a neural network is built with digital circuits, an area of a signal neuron circuit element becomes larger as compared to that of an analog circuit, so that an integration degree in the network can not be raised, but there is no bad effect such as dispersion in the temperature characteristics or in the manufacturing process thereof, and in addition it is relatively easy to form a circuit with output from a neuron stabilized and the reliability improved.

However, in the case shown in FIG. 15 to FIG. 17, learning by the neural network is executed by using an external computer, so that a computer for learning is required, and a disadvantageously long time is required.

The present applicant already proposed a signal processor based on a neural network built with neurons (Refer to, for instance, Japanese Patent Application No.118087/1993). In the present invention, a signal processor according to this previous application is treated as an example for an embodiment of the present invention, so description is made below for the signal processor based on this conventional art.

In the conventional art for a signal processor, the present applicant proposes a neuron unit using a digital logic circuit therein as a neural circuit network and signal processing with a network circuit using the neuron unit therein.

Herein the basic concept is as described below.

1. All of I/O signals, intermediate signals, and teacher signals in the nerve cell unit are expressed with a pulse string consisting of binary numbers of "0" and "1".

2. A value of a signal in the network is expressed with a pulse density (a number of "1" for a certain period of time).

3. Computing in the nerve cell unit is executed in a form of logical operation between pulse strings.

4. A pulse string for a coupling coefficient is stored in a memory in a nerve cell unit.

5. In learning, an error is computed according to a given teacher signal pulse string, and the coefficient is changed according to a result of computing. In this step, also all of computing for an error as well as for a change of coupling coefficient are executed in a form of logical operation for pulse strings consisting of "0" and "1".

FIG. 18 shows a case of forward processing by a neuron element based on a pulse density system, and the network configuration is like the hierarchical type of neural network shown in FIG. 10.

At first, a signal is converted to binary numbers of "0" and "1", a logical product (AND) of the input Oi expressed with a pulse density and the coupling coefficient Wji is computed for each synapse. This corresponds to Wji·Oi in the expression (1) above. A pulse density of output from this AND circuit is in terms of probability a product of a pulse density of input signal and a pulse density of a coupling coefficient.

As described above, types of coupling between neurons are divided to an exciting coupling and a suppressing coupling. In case of numerical operation, a sign of a coupling coefficient is treated, for instance, as positive for an exciting coupling and as negative for a suppressing coupling.

In case of pulse density system, types of coupling are divided to an exciting coupling and a suppressing coupling according to whether a sign of the coupling coefficient Wji is positive or negative, and a logical sum is computed through OR operation for each group. This corresponds to a processing for $\Sigma$ in the expression 3 as well as to a processing for a non-linear saturation function f (net).

Namely, in computing according to a pulse density, when the pulse density is low, the pulse density as a result of OR operation can be approximated to a sum of pulse densities for OR inputs.

As the pulse density becomes higher, output from an OR circuit is gradually saturated, so that the result does not coincide with a sum of pulse densities, and for this reason non-linearity is generated.

In case of this OR operation, a value P of pulse density is equal to or larger than zero and equal to or smaller than 1 ($0 \leq P \leq 1$), and furthermore the value changes as a monotonous increase function of a signal level of input, so that the OR operation is like that through the expression (2) or the sigmoid function shown in FIG. 11.

Output from a neuron element based on the pulse density system is "1" only when the OR output $net_j^+$ from the exciting group obtained through the above operation is "1" and simultaneously the OR output $net_j^-$ from the suppressing group is "0". Namely, the output is as indicated by the following expressions (11) to (13).

$$net_j^+ = \cup_{Wji > 0} (Oi \cap Wji^+) - \text{EXCITING GROUP } (Wji > 0) \quad (11)$$

$$net_j^- = \cup_{Wji < 0} (Oi \cap Wji^-) - \text{SUPPRESSING GROUP } (Wji < 0) \quad (12)$$

$$Oj = net_j^+ \cap \overline{net_j^-} \quad (13)$$

Next description is made for a learning process in the pulse density system. In a neural network where learning is not being executed, an output from the network when a pattern is inputted is not always a desirable one. For this reason, the coupling coefficient is changed so that an error between the actual output value and the desired output value will be minimized by means of a learning process like in the BP algorithm described above.

[Error signal in an output layer]

At first description is made for an error signal in an output layer. Herein if the error is expressed with a numerical value, the value may be either a positive or a negative one, but as such an expression is impossible in the pulse density system, an error signal in an output layer is defined as expressed by the following expressions (14) and (15), using two types of signal; $\delta k^+$ indicating a plus component and $\delta k^-$ indicating a minus component.

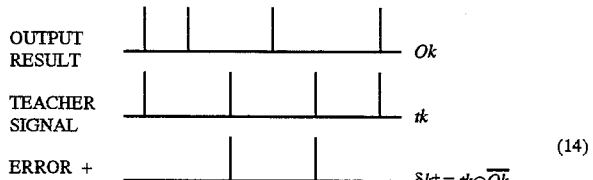

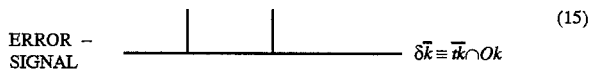

The error signal plus component $\delta k^+$ is "1" when the output result Ok is "0" and the teacher signal tk is "1", and otherwise "0".

On the other hand, the error signal minus component $\delta k^-$ is "1" when the output result Ok is "1" and the teacher signal tk is "0", and otherwise "0".

The error signals $\delta k^+$, $\delta k^-$ correspond to an error ($t_{pk} - O_{pk}$) between a teacher signal and an actual output signal in the expression (7) for obtaining an error signal in an output layer in the BP algorithm described above.

Then, as shown by the expression (7), a product of these error signals and f'(net) which is a one-time differentiation of the output function f(net) is computed to obtain an error signal in an output layer. Generally, for computing an error signal in learning, a differential coefficient obtained by differentiating an output signal with an internal electric potential is required. In the BP algorithm, if a sigmoid function is used as the output function f(net), the one-time differentiation f'(net) is as expressed by the expression (16).

$$f'(net) = df(net)/dnet \qquad (16)$$
$$= f(net) \cdot \{1 - f(net)\}$$

In the pulse density system, with reference to the expression (16), the differential coefficient consisting of a plus component f'(net)$^+$ and a minus component f'(net)$^-$ of the one-time differentiation f'(net) is defined as expressed by the expressions (17) and (18).

$$f'(net)^+ = \overline{Ok} \cap Ok\,(t-1) \qquad (17)$$

$$f'(net)^- = Ok \cap \overline{Ok\,(t-1)} \qquad (18)$$

Herein, Ok (t–1) is a 1 pulse delay value of the output signal Ok. For this reason, a final error signal in the output layer is as expressed by the following expressions (19) and (20). This corresponds to the expression (7) for computing an error signal in an output layer in the BP algorithm described above.

$$\begin{aligned}\delta k^+ &= tk \cap \overline{Ok} \cap f'(net)^+ \qquad (19)\\ &= tk \cap \overline{Ok} \cap \overline{Ok} \cap Ok\,(t-1)\\ &= tk \cap \overline{Ok} \cap Ok\,(t-1)\end{aligned}$$

$$\begin{aligned}\delta k^- &= \overline{tk} \cap Ok \cap f'(net)^- \qquad (20)\\ &= \overline{tk} \cap Ok \cap Ok \cap \overline{Ok\,(t-1)}\\ &= \overline{tk} \cap Ok \cap \overline{Ok\,(t-1)}\end{aligned}$$

[Error signal in an intermediate layer]

Also an error signal in an intermediate layer in the pulse density system is obtained with reference to the expression (8) based on the BP algorithm described above. Namely, error signals in the output layer are collected to form an error signal in an intermediate layer. Herein types of coupling are divided to two groups; an exciting coupling and a suppressing one, and a portion of product is expressed with $\cap$ (AND), while the portion of sum ($\Sigma$) is expressed with $\cup$ (OR).

Furthermore, when computing an error signal in an intermediate layer, cases are divided to four types according to whether a coupling coefficient Wkj is positive or negative, and according to whether the error signal δk is positive or negative. At first, in case of exciting coupling, AND of an error signal component δk$^+$ in an output layer and the coupling coefficient (δk$^+$ $\cap$ Wkj$^+$) is computed for every neuron in the output layer, and OR for these is computed. This is an error signal plus component δj$^+$ for a neuron in an intermediate layer (Expression (21)).

$$\delta j^+ = \cup\,(\delta k^+ \cap Wkj^+) \qquad (21)$$

Similarly, AND of an error signal minus component δk$^-$ in an output layer and the coupling coefficient (δk$^-$ $\cap$ Wkj$^+$) is computed for every neuron in the output layer, and OR for these is computed. This is an error signal minus element of a neuron in the intermediate layer (Expression (22)).

$$\delta j^- = \cup\,(\delta k^- \cap Wkj^+) \qquad (22)$$

Nest description is made for suppressing coupling. In this case, AND of an error signal minus component δk$^-$ and the coupling coefficient (δk$^-$ $\cap$ Wkj) is computed for every neuron in an output layer, and OR for these is computed. This is an error signal plus component in an intermediate layer (Expression (23)).

$$\delta j^+ = \cup\,(\delta k^- \cap Wkj^-) \qquad (23)$$

Similarly, AND of an error signal plus component δk$^+$ in an output layer and the coupling coefficient (δk$^+$ $\cap$ Wkj$^-$) is computed for every neuron in the output layer, and OR for these is computed. This is an error signal minus component for a neuron in the intermediate layer.

$$\delta j^- = \cup\,(\delta k^+ \cap Wkj^-) \qquad (24)$$

Types of a neuron in an intermediate layer and a neuron in an output layer connected thereto are divided to an exciting coupling and a suppressing coupling. For this reason, as a error signal pulse component in an intermediate layer, a logical sum of δj$^+$ for the exciting coupling in the expression (21) and δj$^+$ for the suppressing coupling in the expression (23) is computed as an error signal pulse component in an intermediate layer. Similarly, as a error signal minus component in an intermediate layer a logical sum of δj$^-$ in the expression (22) and δj$^-$ for the suppressing coupling in the expression (24) is computed. Namely, the following expressions (25), (26) are applicable. This corresponds to Σ δ pkWkj in the above expression (8) in the BP algorithm.

$$\delta j^+ = \{\cup\,(\delta k^+ \cap Wkj^+)\} \cup \{\cup(\cup(\delta k^- \cap Wkj^-)\} \qquad (25)$$

$$\delta j^- = \{\cup\,(\delta k^- \cap Wkj^+)\} \cup\{\cup(\delta k^+ \cap Wkj^-)\} \qquad (26)$$

Then, like in the BP algorithm as expressed in the expression (8), δj$^+$ and δj$^-$ are subjected to processing with the differential coefficient (f'(net)) in the expressions (17), (18). For this reason, the error signals in an intermediate layer (δj$^+$, δj$^-$) are obtained through the following expressions (27), (28) respectively.

$$\delta j^+ = f'(net)^+ \cap \delta j^+ = \overline{Oj} \cap Oj\,(t-1) \cap \delta j^+ \qquad (27)$$

$$\delta j^- = f'(net)^- \cap \delta j^- = Oj \cap \overline{Oj\,(t-1)} \cap \delta j^- \qquad (28)$$

[Processing with a learning constant η]

Next description is made for processing with a learning constant η in the expression (6) above for obtaining a correction value ΔW for a coupling coefficient according to the BP algorithm. In numerical calculation, as indicated by the expression (6), only simple multiplication of the learning constant η is required, but in case of the pulse density system, the numerical calculation is realized by thinning out pulse strings according to pulse strings as shown below.

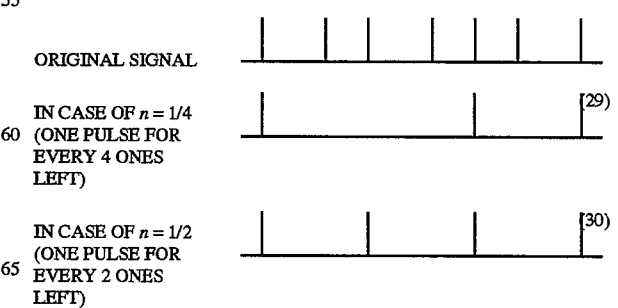

ORIGINAL SIGNAL

IN CASE OF n = 1/4 (ONE PULSE FOR EVERY 4 ONES LEFT) (29)

IN CASE OF n = 1/2 (ONE PULSE FOR EVERY 2 ONES LEFT) (30)

IN CASE OF n = 1
(PULSE IS SAME AS
ORIGINAL SIGNAL)  (31)

Next, a method of calculating a correction rate ΔW for a coupling coefficient through learning is described below. At first, the error signals ($\delta^+$, $\delta^-$) in an output layer or an intermediate layer described above are subjected to processing with the learning constant η, and furthermore a logical product with an input signal into a neuron ($\delta\ \eta\ \cap\ O$) is computed. However, there are error signals $\delta^+$ and $\delta^-$, so that the signals are computed through the following expressions respectively to obtain $\Delta W^+$, and $\Delta W^-$.

$$\Delta W^+ = \delta \eta^+ \cap O \qquad (32)$$

$$\Delta W^- = \delta \eta^- \cap O \qquad (33)$$

This corresponds to the expression (6) for obtaining ΔW in the BP algorithm. A new coupling coefficient NewIIW is obtained depending on these values($\Delta W^+$, and $\Delta W^-$), but the value is treated separately according to whether the coupling coefficient W is an exciting one or a suppressing one. If the coupling coefficient is an exciting one, a component for $\Delta W^+$ is added to and a component for $\Delta W^-$ is subtracted from the original $W^+$. Namely the expression (34) is applicable.

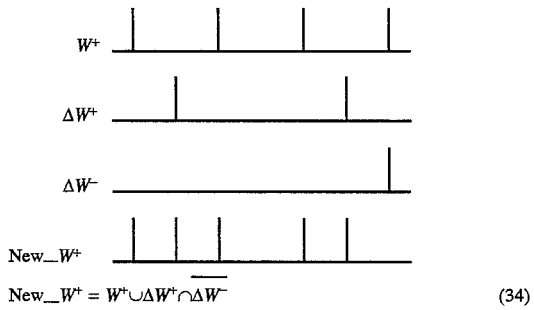

$$\text{New\_}W^+ = W^+ \cup \Delta W^+ \cap \overline{\Delta W^-} \qquad (34)$$

In case of a suppressing coupling, a component for $\Delta W^+$ is subtracted from and a component for a $\Delta W^-$ is added to the original $W^-$. Namely the expression (35) is applicable.

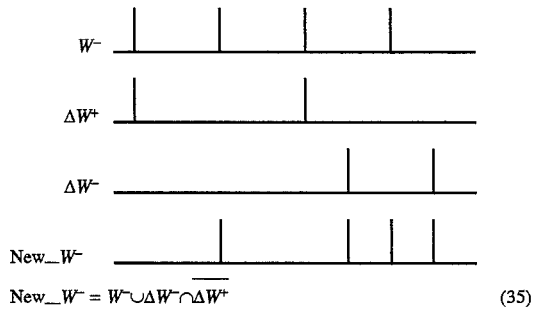

$$\text{New\_}W^- = W^- \cup \Delta W^- \cap \overline{\Delta W^+} \qquad (35)$$

The learning algorithm in the pulse density system is as described above. Now brief description is made for processing flows in a forward process and a learning processing in the pulse density system hierarchical network structure as shown in FIG. 10. At first, in a forward process, when a signal is given to an input layer, the input signal propagates to an intermediate layer, where the signal is processed as signal processing in the intermediate layer through the expressions (11) to (13) above, and the results are propagated to an output layer.

In the output layer, the signals propagated thereto are subjected to processing by the expressions (11) to (13), thus an output as a result of these operations being obtained with the forward process terminated.

In the learning process, after the forward process described above is executed, furthermore a teacher signal is given to the output layer. In the output layer, an error signal in the output layer is obtained through the expressions (19), (20) and the error signal is sent to the intermediate layer. At the same time, this error signal is subjected to the processing with the learning constant η by ways of the expressions (29) to (31), and a logical product with an input signal from the intermediate layer are computed through the expressions (32), (33), and strength of coupling between the output layer and the intermediate layer is changed according to the expressions (34) and (35).

Next as processing in the intermediate layer, depending on an error signal sent from the output layer, an error in the intermediate layer is calculated through the expressions (27), (28), and the result value is subjected to processing with the learning constant η in the expressions (29) to (31), then a logical product with an input signal from the input layer is computed through the expressions (32), (33), strength of coupling between the intermediate layer and the input layer is changed according to the expressions (34), (35), and the learning process is terminated. Subsequently, the learning process is repeated until convergence.

Next description is made for configuration of an actual circuit based on the algorithm described above with reference to FIG. 19 through FIG. 21. Configuration of the neural network is the same as that shown in FIG. 10. FIG. 19 shows a circuit corresponding to synapse in a neuron, while FIG. 20 shows a circuit to compute an error signal in an output layer from a cell body of the neuron in the output layer, output from the output layer and a teacher signal. FIG. 21 shows a circuit in a portion of the neural network for collecting error signals in a cell body of a neuron in the intermediate layer and those in the output layer to obtain an error signal in the intermediate layer. By combining these 3 circuits into a network as shown in FIG. 10, it is possible to realize a neural network circuit based on a digital system which allows self learning.

At first, description is made for FIG. 19. A coupling coefficient for a synapse is stored in a shift register 21. A terminal 21A is a data take-out port, while a terminal 21B is an entrance for data. If this has a function similar to that of a shift register, other ones such as RAM and an address generator may be used. A circuit 22 having the shift register 21 therein is a circuit to execute (Oi ∩ Wji) in the expressions (11), (12) above, and AND of an input signal and the coupling coefficient is computed. Types of output must be divided to groups according to whether the coupling is an exciting one or a suppressing one, but a higher versatility can be provided by preparing outputs $O^+$, $O^-$ for each group and switching the output types according to a type of group. For this purpose, a bit indicating whether the coupling is an exciting one or a suppressing one is stored in a memory 23, and a signal switching is performed by a switching circuit 24 using the information. Also as shown in FIG. 20 and FIG. 21, a plurality of gate circuits 31 each based on OR gate configuration and corresponding to a logical sum in the expressions (11), (12) above for processing each input are provided. Furthermore, as shown in the figures, a gate circuit 32 consisting of an AND gate and an invertor which generates output only when the exciting group shown by the expression (13) is "1" and at the same time the suppressing group is "0" is provided.

Next description is made for an error signal. A circuit 34 shown in FIG. 20 is a circuit generating an error signal in an output layer, which is a logical circuit consisting or AND (logical product) and an invertor, and this circuit corresponds to the expressions (19) and (20) above. Namely, the error signals $\delta k^+$, $\delta k^-$ in the output layers are generated from the output Ok from the output layer, the teacher signal tk, and the signal Ok(t-1) generated by delaying the output Ok from the output layer by a shift register 33. Also the expressions (21) to (24) each for obtaining an error signal in the intermediate layer are executed by the gate circuit 26 having the AND gate configuration shown in FIG. 19, thus outputs $\delta^+$, $\delta^-$ corresponding to the plus component and minus component respectively are obtained. Thus, an error signal varies according to whether the coupling is an exciting one or a suppressing one, so that it is necessary to determine whether the coupling is an exciting one or a suppressing one, and this operation is executed by the gate circuit 25 having AND gate configuration or OR gate configuration respectively according to whether a bit stored in the memory 23 is for an exciting coupling or a suppressing one, and also according to whether the error signal is $\delta^+$ or $\delta^-$. Also the expressions (25), (26) each for collecting error signals is executed by a gate circuit 36 having OR gate configuration shown in FIG. 21. The circuit executing the expressions (27), (28) for obtaining error signals $\delta j^+$, $\delta j^-$ respectively is the circuit 37 shown in FIG. 21, where and the error signals $\delta j^+$, $\delta j^-$ are generated from the signal Oj(t-1) obtained by delaying the output Oj from the intermediate layer with the shift register 33 and an error signal from the output which is an output from the OR circuit 36. Also the expressions (29) to (31) corresponding to a learning rate are executed by the η circuit 35 for a learning constant shown in FIG. 20 and FIG. 21.

At last description is made for a portion in which a new coupling coefficient is calculated from an error signal. This operations are expressed by the expressions (32) to (35) above, and the operations are executed by the gate circuit 27 consisting of AND, invertor, and OR gates shown in FIG. 19. Also type of coupling in this gate circuit must be classified to an exciting one or a suppressing one, and this classification is executed by the gate circuit 25.

In the neural network based on the pulse density system according to the conventional art, it is considered that the method of obtaining a differential coefficient for an output function is not applicable to the expressions (19), (20) each for obtaining an error signal in the output layer in the learning process for updating the coupling coefficient, nor to the circuit for executing the operation (shown in FIG. 20).

For, in the expressions (19), (20) for obtaining error signals $\delta k^+$, $\delta k^-$ in an output layer respectively, and especially in the expression (19) for obtaining $\delta k^+$, as shown in the expression, a negating component for Ok is duplicated, and "a logical product of negation of Ok and negation of Ok" is abbreviated to "negation of Ok", while in the expression (20) for obtaining $\delta k^-$, the OK component is duplicated as shown in the expression, and "a logical product of Ok and Ok" is abbreviated to "Ok". In a learning process in a neural network, learning can not be executed successfully due to this effect, and there occur such problems as low convergence rate.

SUMMARY OF THE INVENTION

It is an object of the invention to provide signal processor which proposes an improved method of computing a differential coefficient when obtaining an error signal in an output layer for realization of a neural network based on the pulse density system insuring a high learning efficiency.

With the present invention, a term for computing a differential coefficient is not abbreviated when updating a coupling coefficient, and it is possible to raise a convergence rate in learning by regularly computing an error signal.

Other objects and features of this invention will become understood from the following description with reference to the accompanying drawings.

BRIEF DESCRIPTION OF THE DRAWINGS

FIG. 3 is a block diagram illustrating a circuit in a portion which is equivalent to a synapse of a neuron;

FIG. 4 is a logical circuit diagram illustrating a circuit which generates an error signal in an output layer;

FIG. 5 is a logical circuit diagram illustrating a circuit which generates an error signal in an intermediate layer;

DESCRIPTION OF THE PREFERRED EMBODIMENTS

Figure 1:
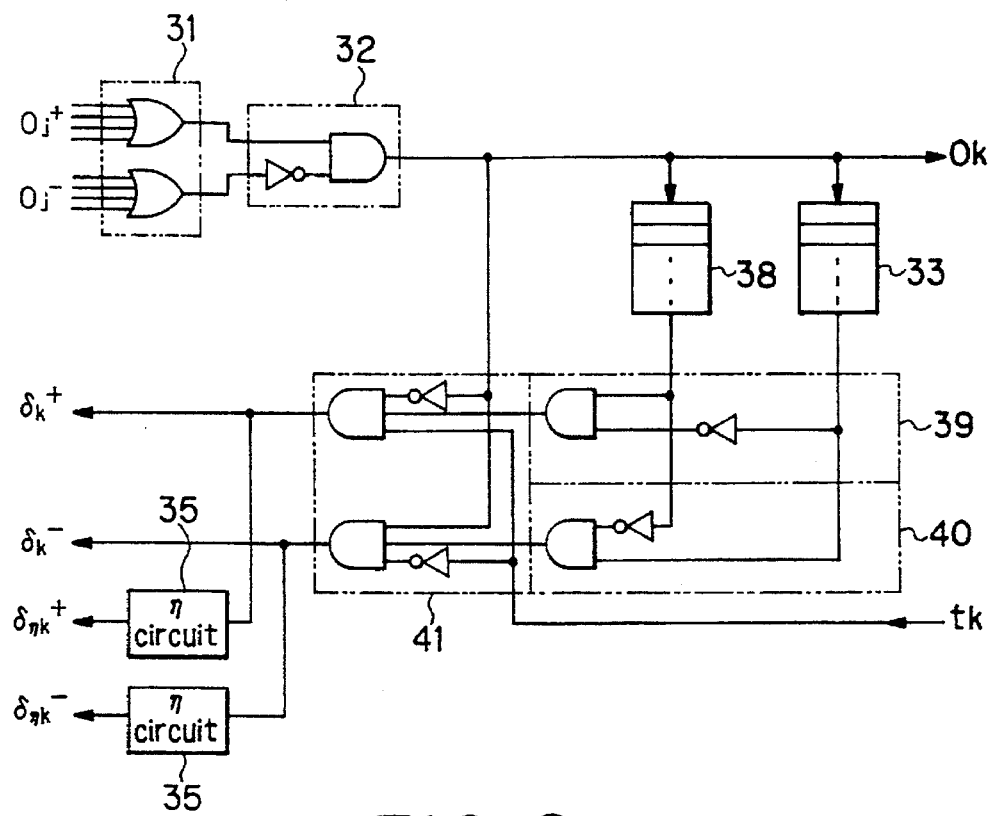
FIG. 1 is a block diagram illustrating a nerve body circuit.

Description is made hereinafter for embodiments of the present invention. An object of the present invention is to solve the problems in the conventional art by obtaining a differential coefficient using the following expressions (36), (37) in place of the expressions (17), (18) each for obtaining a differential coefficient in an output layer in a neural network according to the conventional art and also by obtaining an error signal using the differential coefficient above.

At first, description is made for the algorithm according to the present invention. The differential coefficient in an output layer according to the present invention is obtained through the following expressions (36), (37) as described above.

$$f'(net)^+ = \overline{Ok\,(t-m)} \cap Ok\,(t-n) \qquad (36)$$

$$f'(net)^- = Ok\,(t-m) \cap \overline{Ok\,(t-n)} \qquad (37)$$

Herein, Ok(t−m) is a m-cycle delayed value of output Ok from the output layer, while Ok(t−n) is an n-cycle delayed value of output Ok from the output layer. It should be noted that m is not equal to n. Because of this, the expressions (19), (20) for obtaining an error signal in an output layer can be modified to the following ones.

$$\begin{aligned}\delta k^+ &= tk \cap \overline{Ok} \cap f'(net)^+ \\ &= tk \cap \overline{Ok} \cap \overline{Ok\,(t-m)} \cap Ok\,(t-n)\end{aligned} \qquad (38)$$

$$\begin{aligned}\delta k^- &= \overline{tk} \cap Ok \cap f'(net)^- \\ &= \overline{tk} \cap Ok \cap Ok\,(t-m) \cap \overline{Ok\,(t-n)}\end{aligned} \qquad (39)$$

Because of the reasons described above, the necessity of abbreviating the "logical product of negation of Ok and negation of Ok" to "negation of Ok" or the "logical product of Ok and Ok" to "Ok" in the expressions (19) and (20) respectively is eliminated, and as a result, an error signal in an output layer is regularly calculated.

Figure 20:
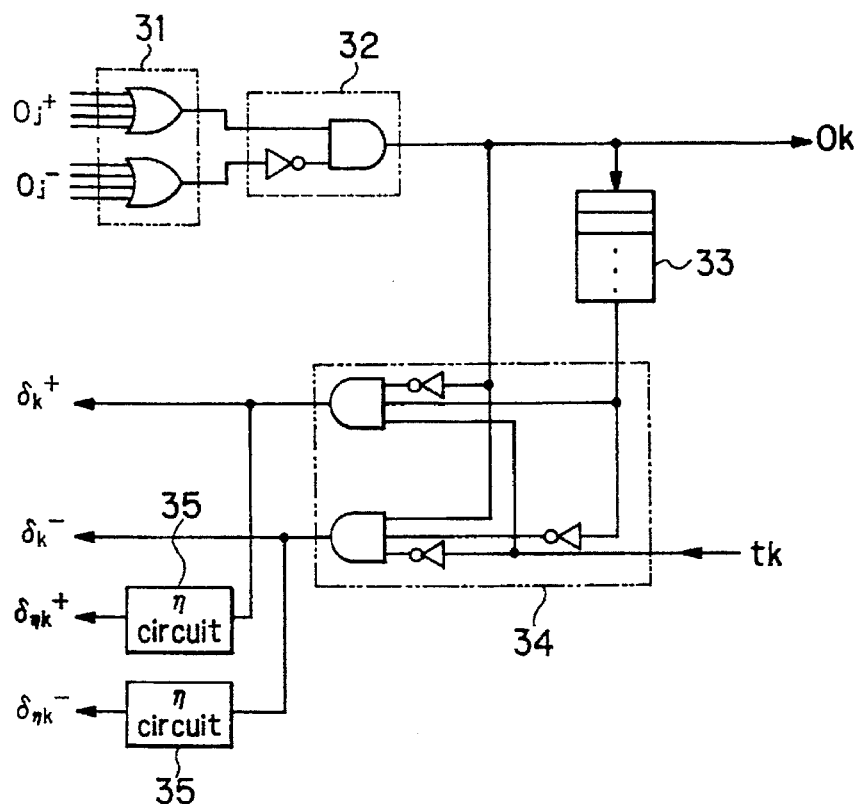
FIG. 20 is an electric circuit diagram which is equivalent to a signal neuron.

A first embodiment of the present invention for executing this operation is shown in FIG. 1. A difference of this embodiment from the circuit shown in FIG. 20 according to the conventional art described above is that a shift register 38 to obtain a delayed value for an output from an output layer is added anew, and also that the error generating section 34 according to the conventional art shown in FIG. 20 was changed to the circuits 39 to 41 shown in FIG. 1. Functions other than this are the same as previous ones, so that same reference numbers are assigned to the same components.

As shown in FIG. 1, output from the gate circuit 31 consisting of a plurality of OR gates equivalent to a logical sum each in the expressions (11) and (12) is given to the gate circuit 32 consisting of an AND gate and an invertor. Output Ok is outputted from this gate circuit 32 when the exciting group indicated by the expression (13) above is "1" and the suppressing group is "0". The output Ok from this output layer is supplied to the shift registers 33 and 38 respectively. The shift register 33 generates the signal Ok(t−m) obtained by delaying output Ok from the output layer by m cycles, while the shift register 38 generates the signal Ok(t−n) obtained by delaying the output Ok from the output layer by n cycles.

The plus component f'(net)⁺ of a differential coefficient in the expression (36) is generated by the logical product circuit 39 consisting of AND and an invertor. On the other hand, the minus component f'(net)⁻ of a differential coefficient in the expression (37) is generated by a logical product circuit 40 consisting of AND and an invertor. Operations indicated by the expressions (38), (39) are executed by a gate circuit 41 consisting of AND and an invertor using these differential coefficients and the teacher signal tk as input to generate error signals δk⁺, δk⁻ to be outputted.

Figure 2:
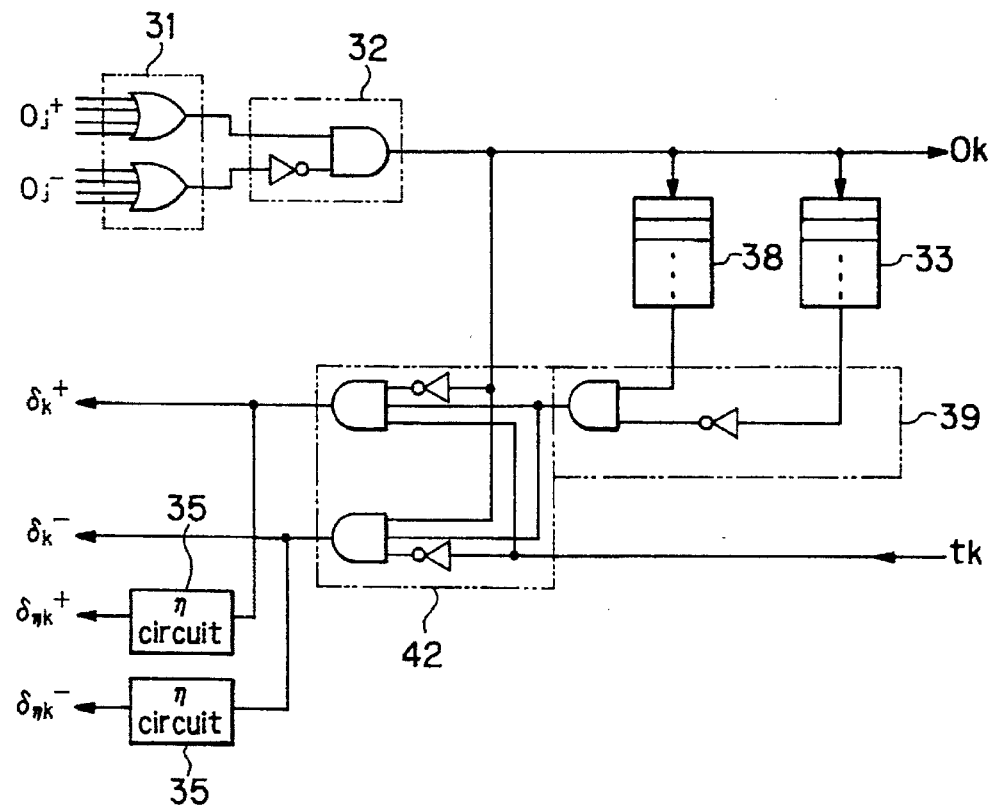
FIG. 2 is a diagrammatic view illustrating a forward processing by a neuron element in the pulse density system.

A second embodiment of the present invention is shown in FIG. 2. In this second embodiment, an error signal in an error signal is obtained from the expressions (41), (42) using a differential coefficient obtained through the following expression (40).

$$f'(net)^+ = f'(net)^- = Ok\,\overline{(t-m)} \cap Ok\,(t-n) \qquad (40)$$

$$\begin{aligned}\delta k^+ &= tk \cap \overline{Ok} \cap f'(net)^+ \\ &= tk \cap \overline{Ok} \cap \overline{Ok\,(t-m)} \cap Ok\,(t-n)\end{aligned} \qquad (41)$$

$$\begin{aligned}\delta k^- &= \overline{tk} \cap Ok \cap f'(net)^- \\ &= \overline{tk} \cap Ok \cap \overline{Ok\,(t-m)} \cap Ok\,(t-n)\end{aligned} \qquad (42)$$

In this expression, the plus component f'(net)+ and minus component f'(net)− each of the differential coefficient are treated equally, and a differential coefficient is generated by one of the logical product circuits 39 each consisting of AND and an invertor. Operations indicated by the expressions (41), (42) are executed by the gate circuit 42 consisting of AND and an invertor using this differential coefficient and teacher signal tk as input to generate error signals δk⁺, δk⁻.

A number of circuits in the second embodiment shown in FIG. 2 is a little smaller than that in the first embodiment shown in FIG. 1, but the error signals δk⁺, δk⁻ in the output layer each obtained thus becomes equal in terms of probability to those in the first embodiment described above, thus the same function being provided.

Next a simple simulation for digit recognition was carried out to confirm the characteristics of the present invention and improvement thereof as compared to the conventional system.

Figure 3:
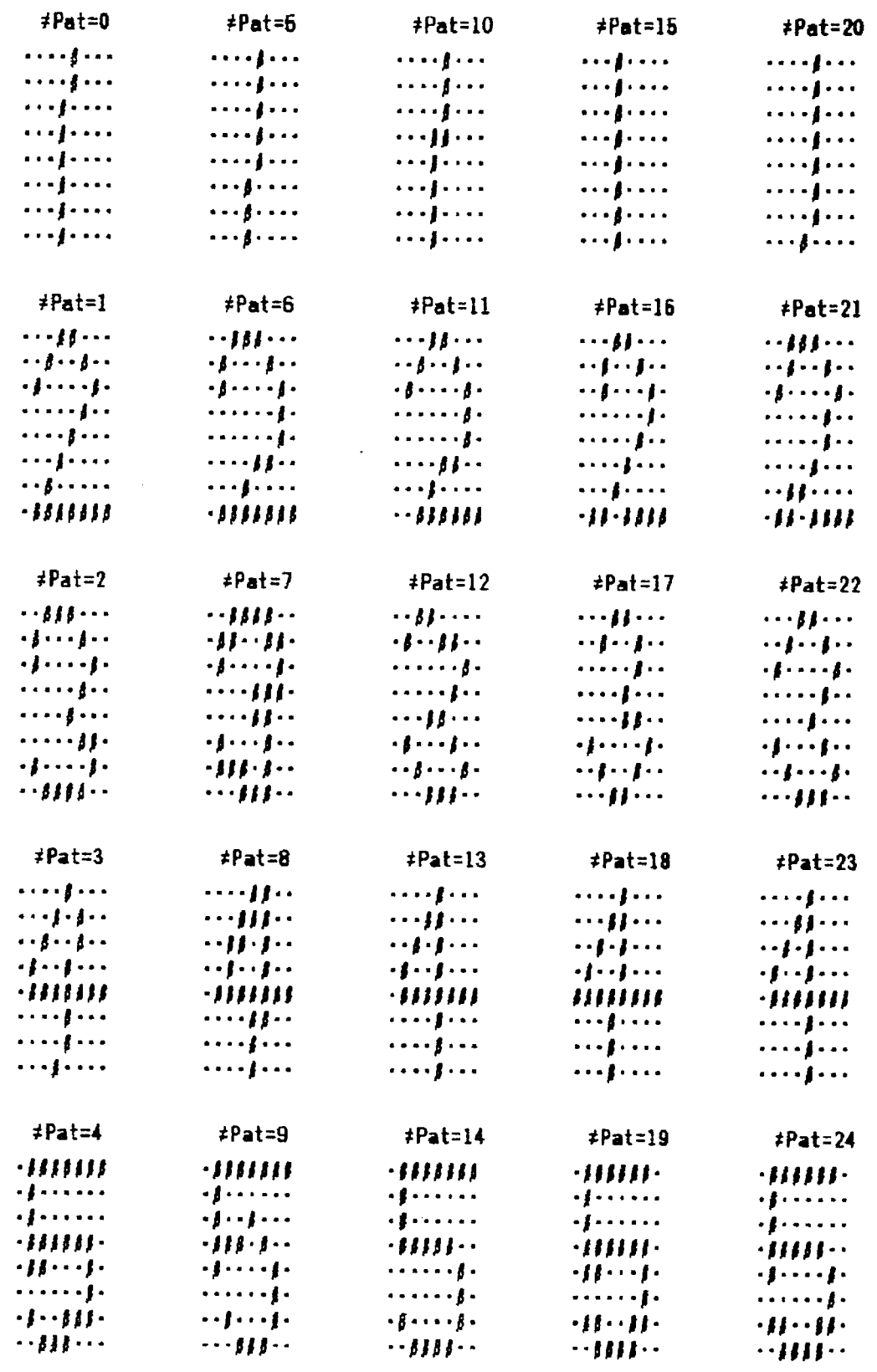

In this simulation, a practice to learn 5 types of digit pattern consisting of "1" to "5", totally 25 patterns is executed. The digit patterns used in this practice are shown in FIG. 3. Further detailed description is made for the digit patterns. Numbers each indicating a difference in a pixel pattern between the digit patterns are shown in FIG. 5. This table shows differences between patterns quantitatively, and as shown in this table, the difference between similar patterns becomes a small value, while that between different patterns becomes a large value. For instance, pattern No.0 in the first line in FIG. 5, namely the digit pattern of "1" in FIG. 3 is the same pattern of "1" in the patterns [5], [10], [15], and [20] in the string, so that the patterns are similar to each other and the value is small. On the other hand, the pattern is different from the patterns "2" to "5" in the strings other than these, so that the value is relatively large.

When a practice for digit recognition is executed in a neural network, the neural network learns features of these patterns first and fetches the patterns thereinto, so that the neural network becomes capable of correctly recognizing the patterns "1" to "5" even if there exists slight external disturbance such as noise.

The used neural network is a three-layered hierarchical neural network, and the input hierarchy consists of 64 neurons corresponding to a digit pattern of 8×8 pixels. Correspondence between each pixel and an input neuron number is as shown in FIG. 4. The intermediate layer consists of 4 to 32 neurons, while the output layer consists of 5 neurons, and this corresponds to the digit patterns "1" to "5". Times of trial is 100 times.

Figures 6, 7:
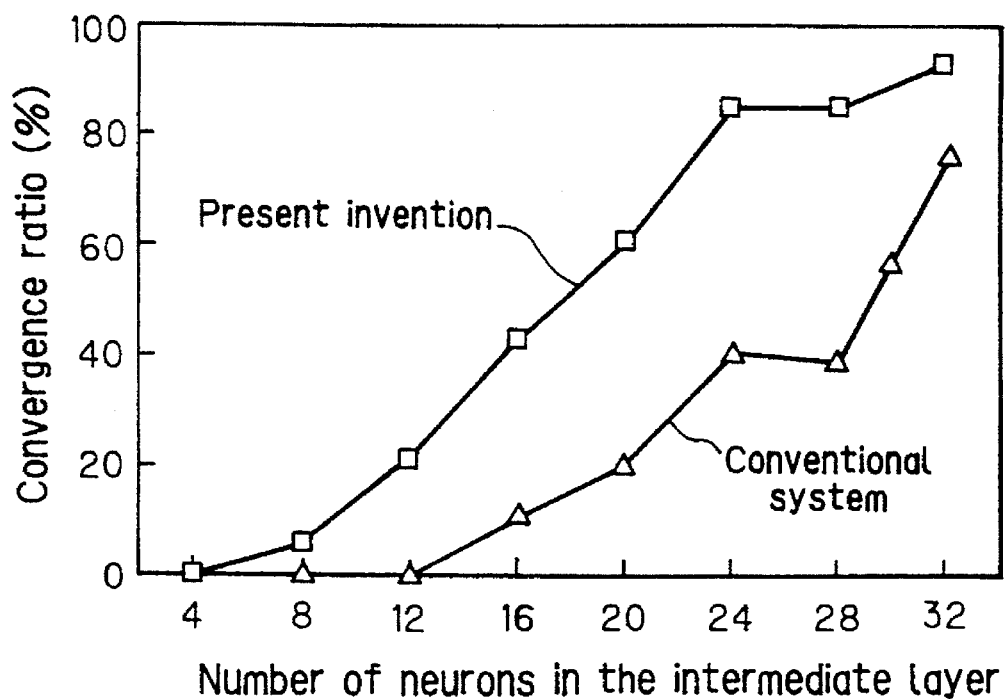
FIG. 6 is a block diagram illustrating a first embodiment of the present invention.
FIG. 7 is a block diagram illustrating a second embodiment of the present invention.

As for s result of simulation, of the 100 times of trial, times of trial in which learning was converged; namely all the digit patterns were correctly recognized as "1" to "5" are shown in FIG. 6 and FIG. 7. It should be noted that, as 100 times of trial are assumed herein, the times of successful trial directly means the convergence ratio (%).

In this system shown in FIG. 6 and FIG. 7 in which a differential term is presumably calculated correctly, the convergence ratio of learning is substantially higher than that in the conventional system, and a visible effect of the error production system can be observed. Also in the two systems, the more neuron exists in the intermediate layer, the higher the convergence ratio is. The reason is probably that, in this range of a number of neurons in an intermediate layer, the more neurons exist, namely the more couplings between neurons exist, the higher volume of data is fetched into the neural network, thus more efficient pattern recognition being executed. Next consideration is made for a result of simulation as described above from a view pint of the neuro-characteristics.

Figure 11:
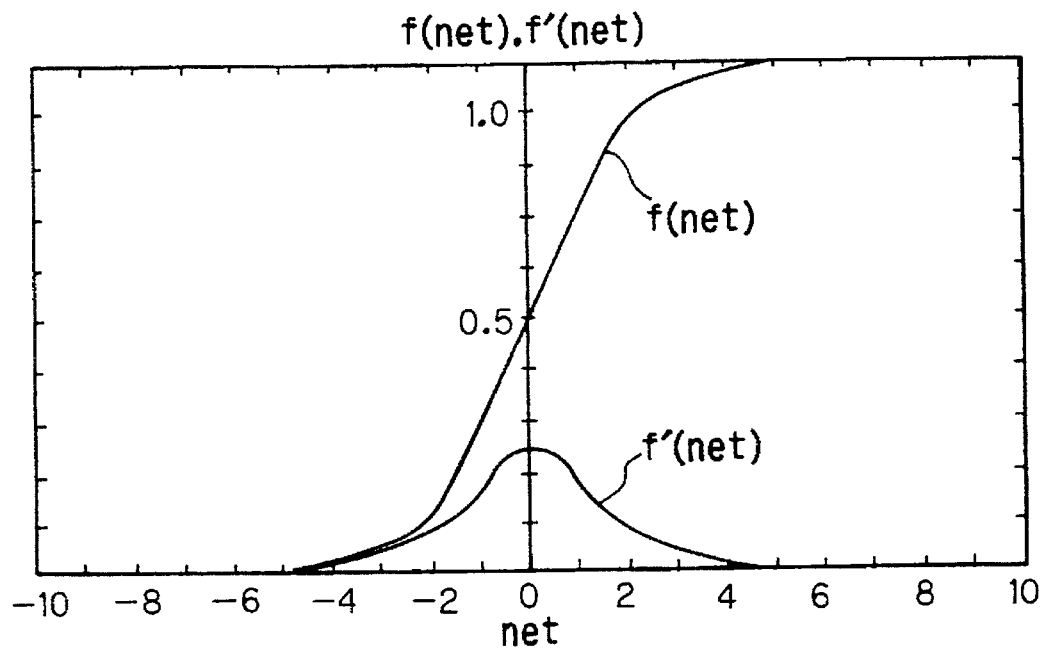
FIG. 11 is a view illustrating relation between a neuron number in an intermediate layer and a convergence rate.
Figure 12:
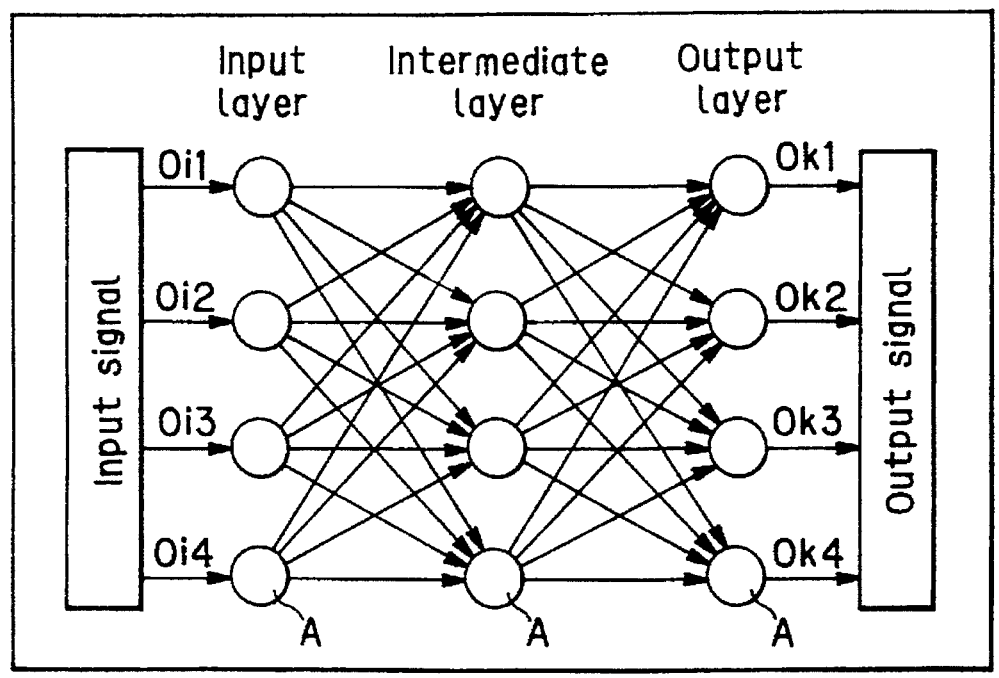
FIG. 12 is a view illustrating relation between a neuron number in an intermediate layer and a convergence rate.
Figure 13:
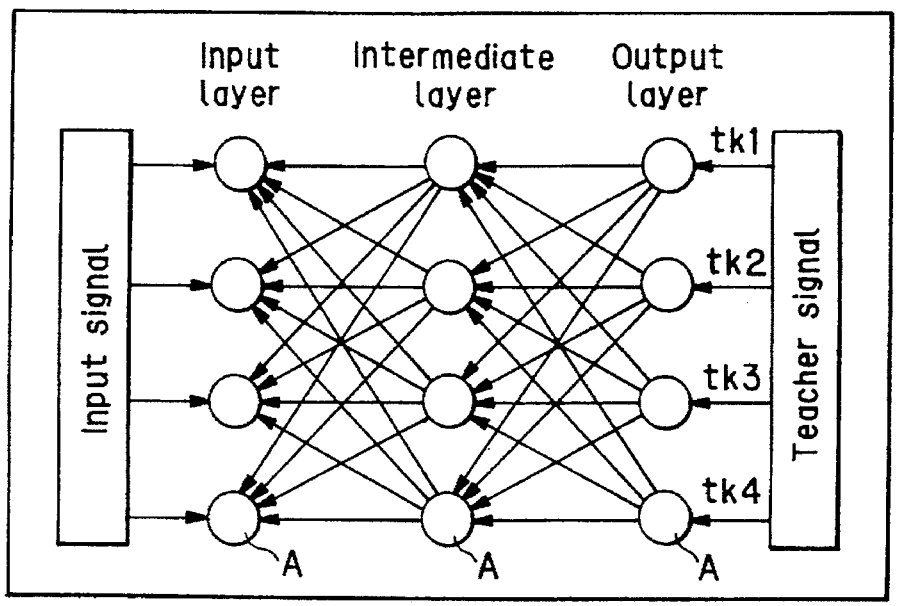
FIG. 13 is a view illustrating a differential coefficient for an output function.
Figure 14:
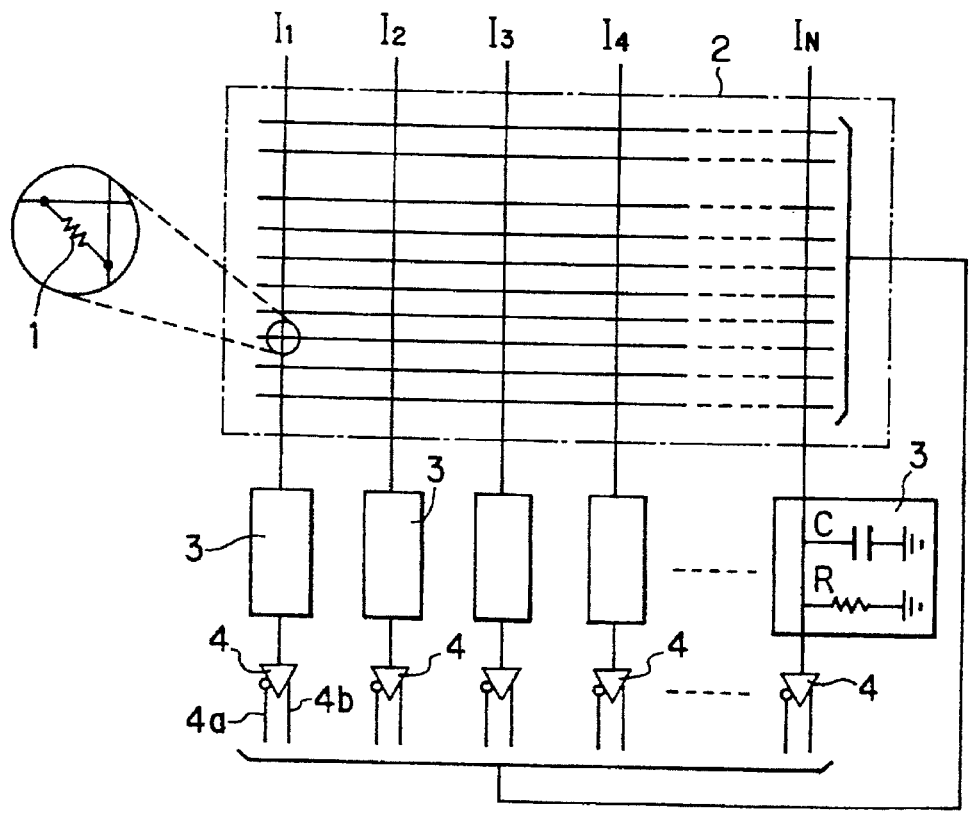
FIG. 14 is a diagrammatic view of a neuron unit.
Figure 15:
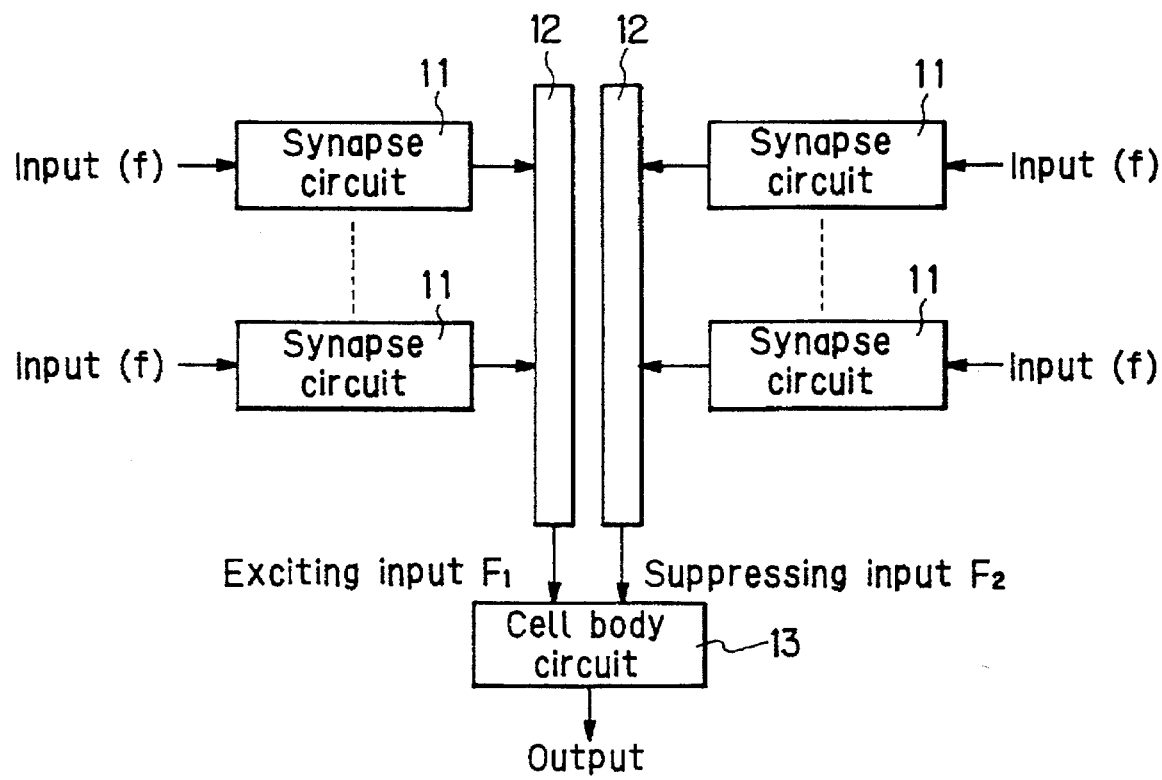
FIG. 15 is a diagrammatic view of a neural network.
Figure 16:
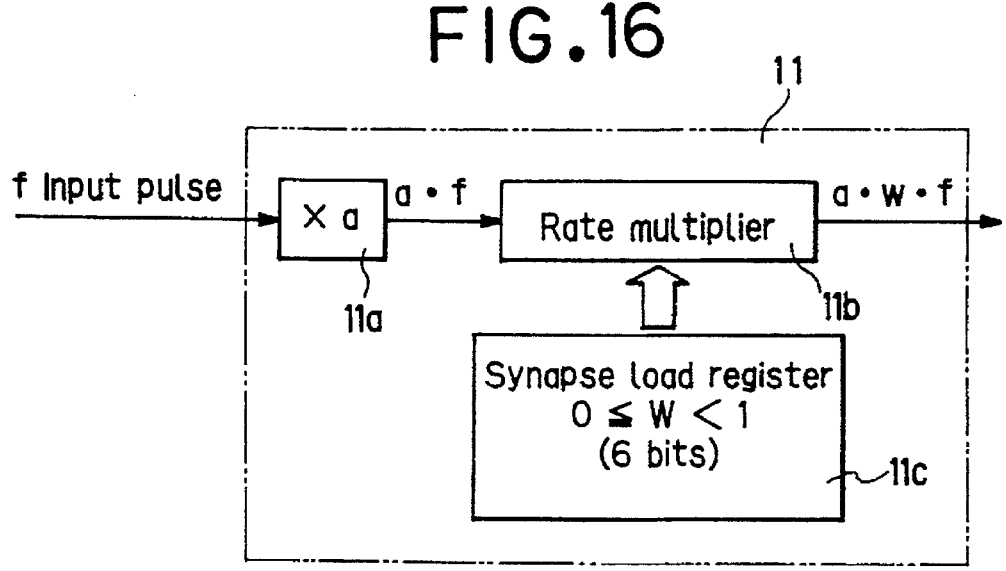
FIG. 16 is a graph illustrating a sigmoid graph.
Figure 17:
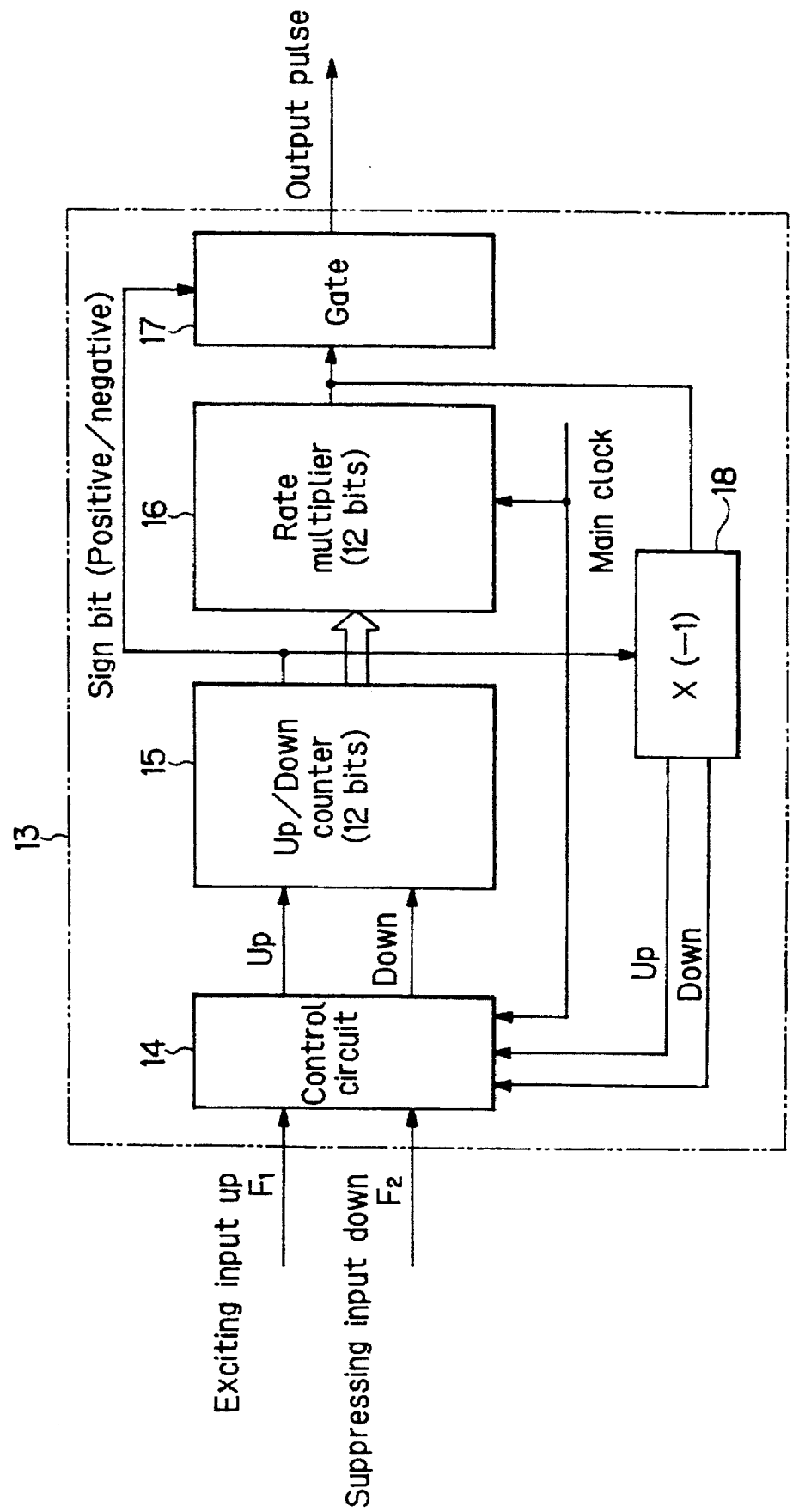
FIG. 17 is a diagrammatic view illustrating a forward process.
Figure 18:
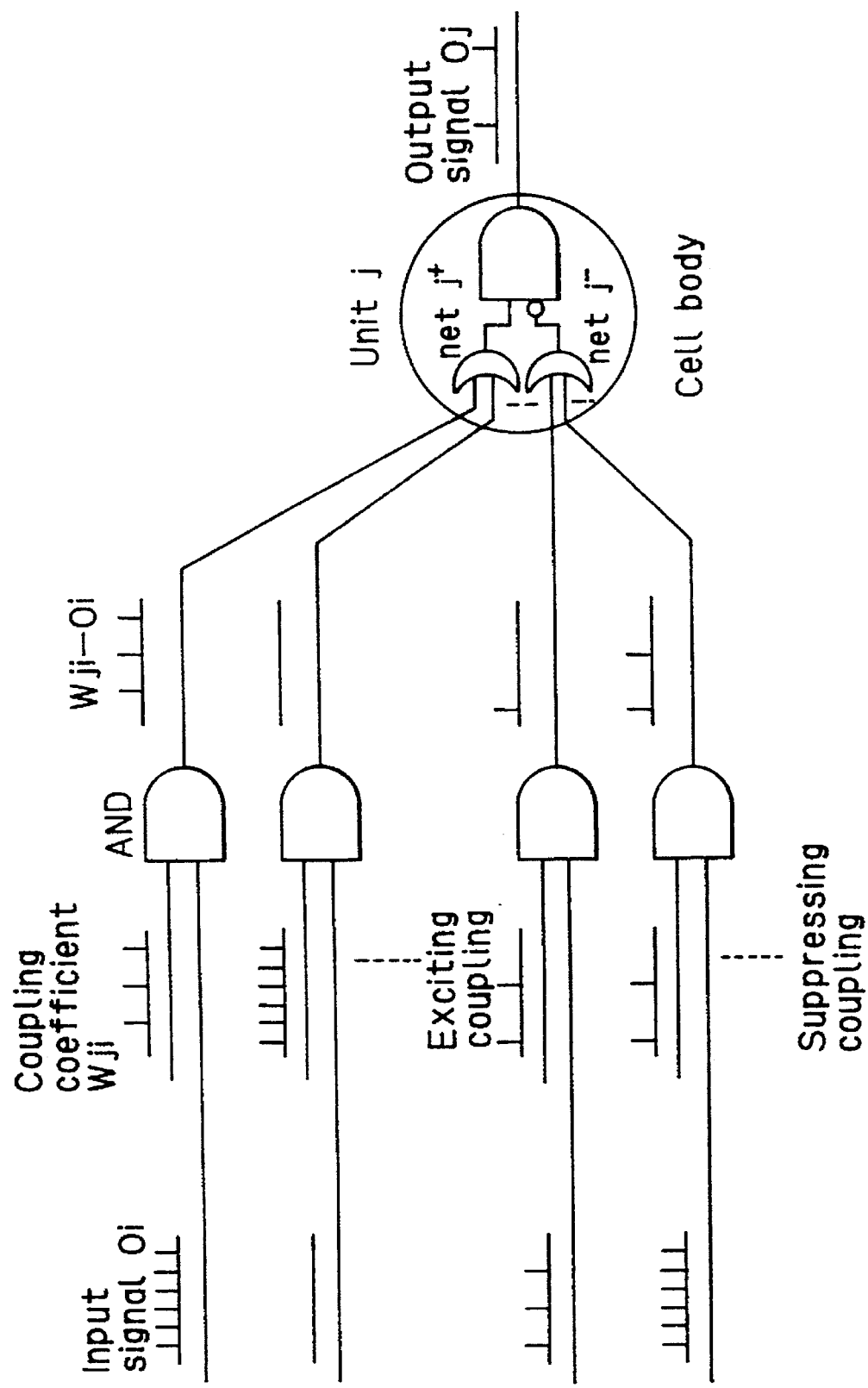
FIG. 18 is a diagrammatic view illustrating a learning process.
Figure 19:
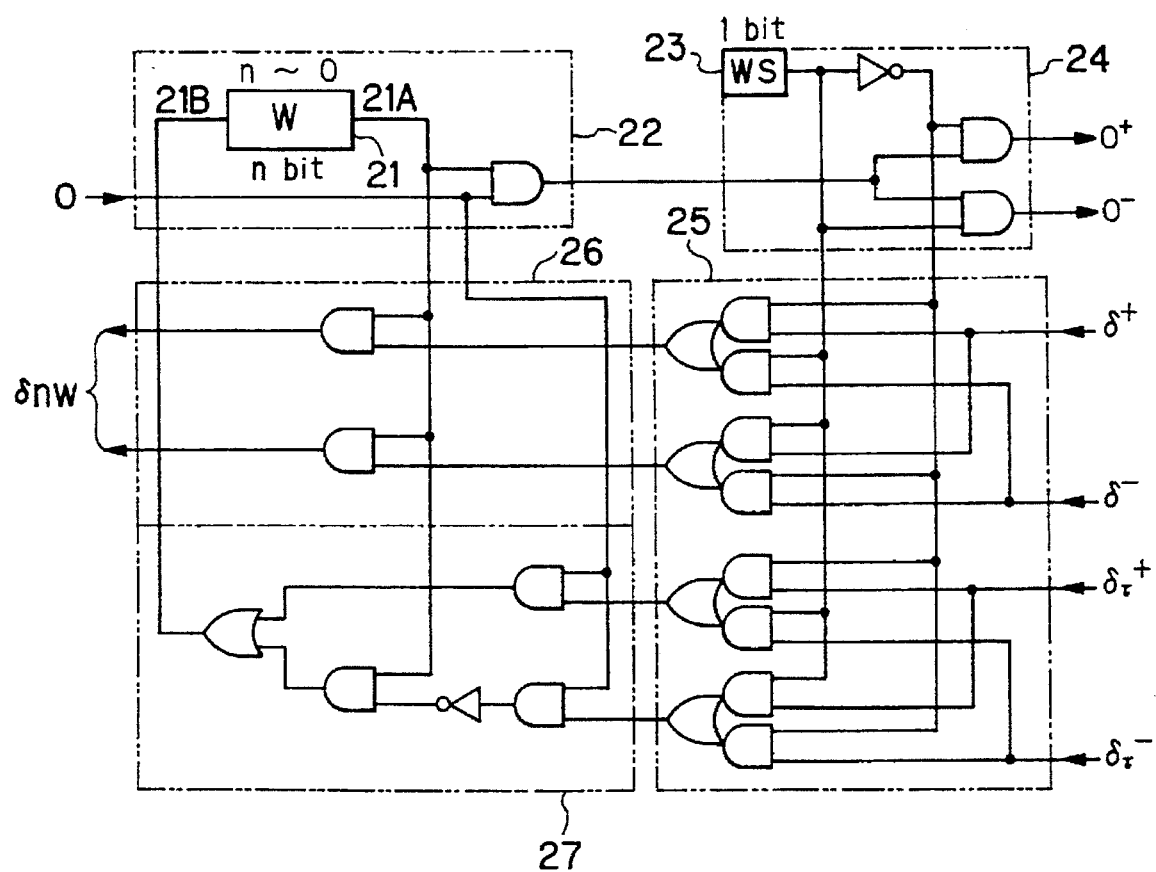
FIG. 19 is an electric circuit which is equivalent to a neural network.

As an output function of a neuron in a neural network, the general sigmoid function (net) and the differential coefficient f'(net) are as shown in FIG. 11 As shown in FIG. 11, when net is equal to zero (net=0), f(net) is equal to 0.5 (f(net)=0.5), so that in this functions the function value becomes larger in association with increase of the net value. As for the differential coefficient f'(net), when net is equal to zero (net=0), the maximum value f'(net) is equal to 0.25 (f'(net) =0.25), so that the function makes a curve in which the value becomes smaller as net goes further from zero.

Figure 8:
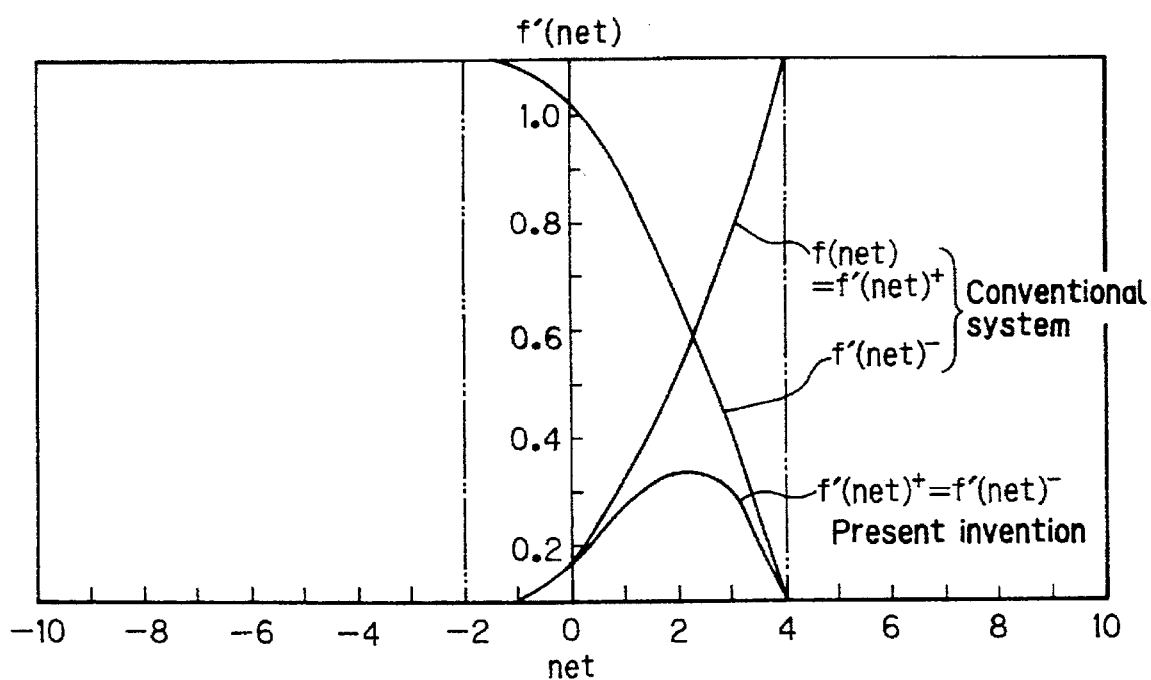
FIG. 8 is a diagrammatic view illustrating an example of a digital pattern using a digit recognizing simulation.
Figure 9:
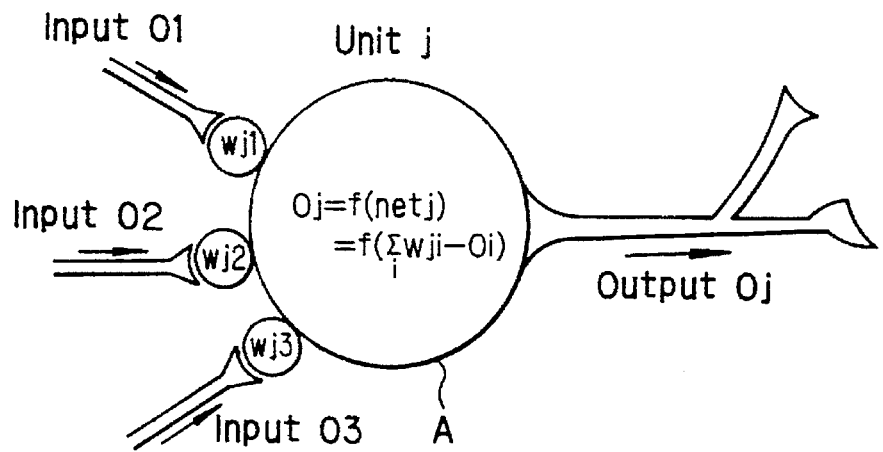
FIG. 9 is a view illustrating correspondence between each pixel and a neuron number.
Figure 10:
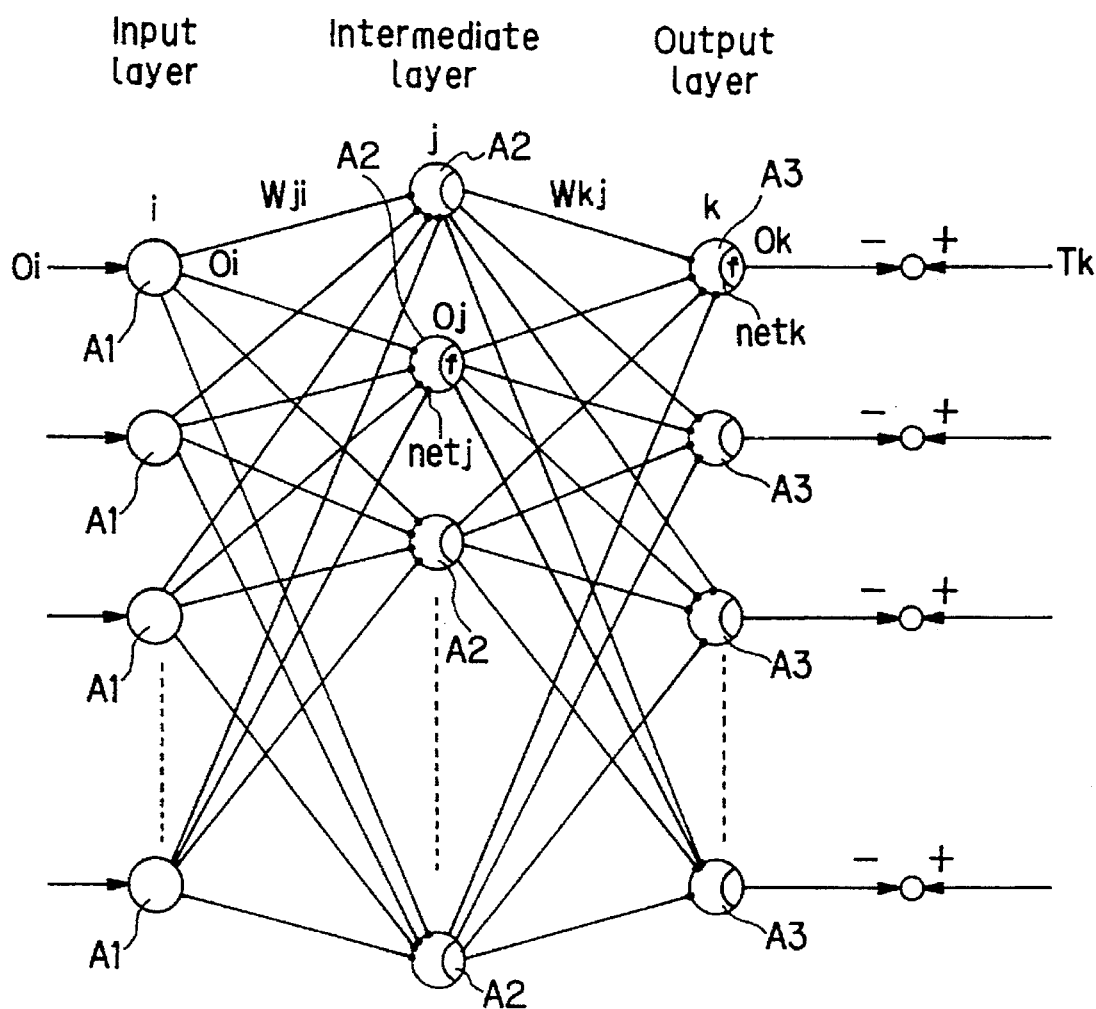
FIG. 10 is a view illustrating a number indicating a difference in pixel numbers between each digital pattern.

Output characteristics and differential characteristics in a neural network based on the pulse density system are shown in FIG. 8. This figures shows pulse neuro-characteristics of the exciting input 4 and suppressive input 2, and the net value then is equal to or larger than −2 and not more than 4 (−2<=net<=4). The output value f(net) is a increase function, but the curve form is different from that of the sigmoid function shown in FIG. 11.

FIG. 8 shows differential coefficients f'(net)$^+$ and f'(net)$^-$ of an output function in the conventional system. In this case, as indicated by the expressions (19), (20) each for obtaining an error signal in an output layer in the conventional system, the plus component of the differential term f'(net)$^+$ is equal to f(net) (f'(net)$^+$=f(net)), so the value forms a functional curve with the right side higher, while it is regarded that the minus component of the differential term f'(net)$^-$ is equal to {1−f(net)}; namely a functional curve with the right side lower.

Figure 21:
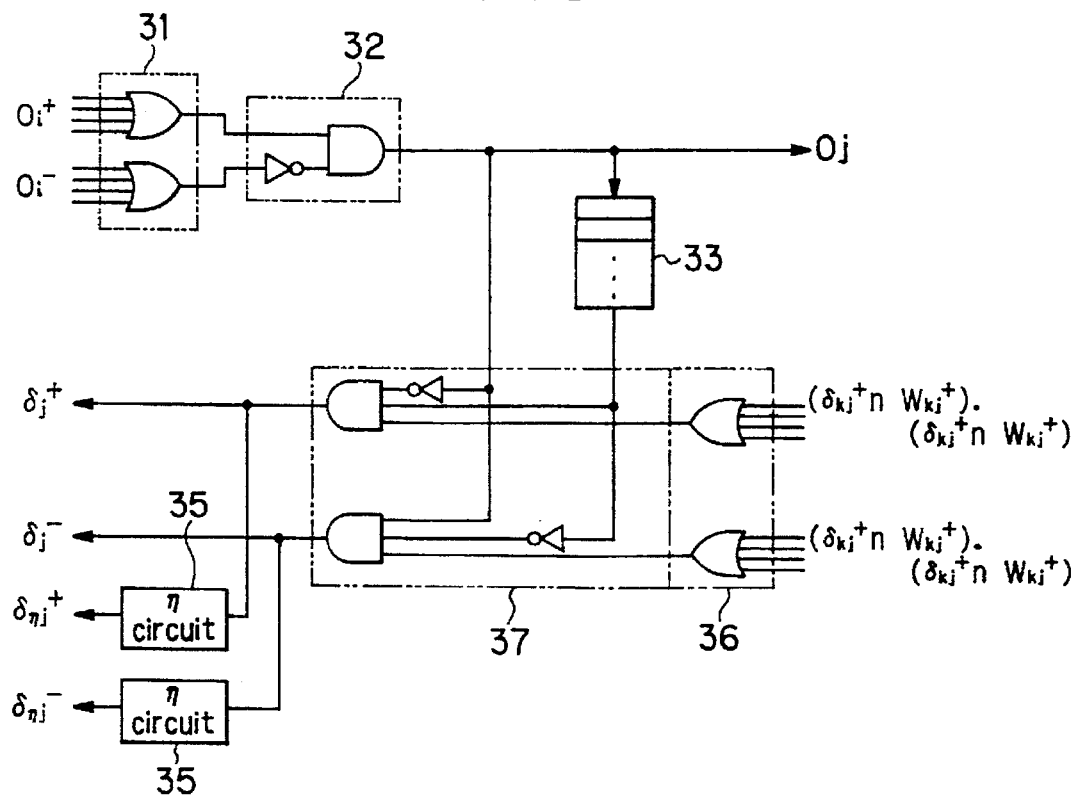
FIG. 21 is a block circuit view of a synapse circuit.

In contrast, in the present invention in which the conventional system has been improved, it can be regarded because of the expressions (38), (39) and expressions (41), (42) that f'(net)$^+$=f'(net)$^-$=f(net)··{1−f(net)}, so that a functional curve having the convex shaped as shown in FIG. 21 is given which is similar to the differential characteristics of a sigmoid curve. Thus, also from a result of the simulation for digit recognition it is understood that the convergence ratio in learning is higher and more effective in the system according to the present invention as compared to those in the conventional system.

As described above, with the present invention, it is not required to abbreviate a term for computing a differential term when updating a coupling coefficient, so that an error signal is regularly computed and the convergence ratio in learning becomes higher.

Although the invention has been described with respect to a specific embodiment for a complete and clear disclosure, the appended claims are not to be thus limited but are to be construed as embodying all modifications and alternative constructions that may occur to one skilled in the art which fairly fall within the basic teaching herein set forth.

What is claimed is:

1. A signal processor comprising: a coupling updating unit for updating a coupling coefficient according to a positive error signal and a negative error signal each generated depending on a teacher signal and output from a neuron-simulated element in which a plurality of neuron elements are connected to each other in a form like a network by combining said coupling updating unit with said neuron-simulated element;

a first delaying unit for delaying an output from said neuron-simulated element by m cycles;

a second delaying unit for delaying an output from said neuron-simulated element by n cycles wherein n is not equal to m;

a first logical product unit for computing a logical product of an output from said first delaying unit above and an output from said second delaying unit; and a second logical product unit for computing a logical product of negation of an output from said first delaying unit and negation of an output from said second delaying unit.

2. A signal processor according to claim 1, wherein said coupling coefficient is updated using an output from said first logical product unit as one differential coefficient of a neuron response function and an output from said second logical product unit as the other differential coefficient of the neuron response function.

3. A signal processor comprising:

a coupling updating unit for updating a coupling coefficient according to a positive error signal and a negative error signal each generated depending on a teacher signal and output from a neuron-simulated element in which a plurality of neuron elements are connected to each other in a form like a network by combining said coupling updating unit with said neuron-simulated element;

a first delaying unit for delaying an output from said neuron-simulated element by m cycles;

a second delaying unit for delaying an output from said neuron-simulated element by n cycles wherein n is not equal to m;

a logical product unit for computing a logical product of an output from said first delaying unit and negation of an output from said second delaying unit.

4. A signal processor according to claim 3, wherein an output from said logical product unit is used as a differential coefficient in a neuron response function to update the coupling coefficient.

* * * * *